(12) United States Patent
Burch et al.

(10) Patent No.: US 9,219,762 B2
(45) Date of Patent: *Dec. 22, 2015

(54) TECHNIQUES FOR DESKTOP MIGRATION

(71) Applicant: NetIQ Corporation, Provo, UT (US)

(72) Inventors: Lloyd Leon Burch, Payson, UT (US);
Michael F. Angelo, Spring, TX (US);
Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/718,073

(22) Filed: Dec. 18, 2012

(65) Prior Publication Data

US 2014/0122731 A1 May 1, 2014

Related U.S. Application Data

(63) Continuation-in-part of application No. 13/663,736, filed on Oct. 30, 2012.

(51) Int. Cl.
| | |
|---|---|
| *H04L 9/32* | (2006.01) |
| *H04L 29/06* | (2006.01) |
| *H04L 29/12* | (2006.01) |
| *H04L 29/08* | (2006.01) |
| *H04W 12/06* | (2009.01) |

(52) U.S. Cl.
CPC ............ *H04L 65/1066* (2013.01); *H04L 9/32* (2013.01); *H04L 9/321* (2013.01); *H04L 9/3213* (2013.01); *H04L 9/3228* (2013.01); *H04L 9/3263* (2013.01); *H04L 61/203* (2013.01); *H04L 63/0853* (2013.01); *H04L 63/0884* (2013.01); *H04L 67/148* (2013.01); *H04W 12/06* (2013.01)

(58) Field of Classification Search
CPC ......... H04L 9/32; H04L 9/321; H04L 9/3213; H04L 9/3228; H04L 9/3263; H04L 61/203; H04L 63/0084
USPC .......... 709/227, 228, 229, 204, 219; 726/5, 7, 726/9; 725/25; 379/88.01; 713/165; 455/41.2; 370/329

See application file for complete search history.

(56) References Cited

U.S. PATENT DOCUMENTS

| | | |
|---|---|---|
| 6,877,111 B2 | 4/2005 | Sharma et al. |
| 7,502,824 B2 | 3/2009 | Kaluskar et al. |
| 7,552,218 B2 | 6/2009 | Kaluskar et al. |
| 7,587,400 B2 | 9/2009 | Bastawala et al. |
| 7,646,755 B2 | 1/2010 | Kurlander et al. |
| 8,116,685 B2 | 2/2012 | Bregman-amitai et al. |

(Continued)

OTHER PUBLICATIONS

"U.S. Appl. No. 13/663,736, Non Final Office Action mailed Nov. 5, 2014", 9 pgs.

(Continued)

*Primary Examiner* — Le H Luu
(74) *Attorney, Agent, or Firm* — Schwegman Lundberg & Woessner, P.A.

(57) ABSTRACT

Techniques for desktop migration are presented. A user authenticates to an original device and a token is generated for remoting to that device's desktop. A target device acquires the token while in proximity to the original device and uses the token to authenticate to a third-party service that provides a second token back to the target device. The second token permits the target device to authenticate and to directly connect via remoting software to the original device's desktop.

20 Claims, 4 Drawing Sheets

(56) References Cited

U.S. PATENT DOCUMENTS

| | | |
|---|---|---|
| 8,166,176 B2 | 4/2012 | Kumar et al. |
| 8,228,861 B1 * | 7/2012 | Nix ............................. 370/329 |
| 8,234,236 B2 | 7/2012 | Beaty et al. |
| 8,255,690 B2 | 8/2012 | Wiseman et al. |
| 8,738,699 B2 | 5/2014 | Hovdal et al. |
| 2008/0059639 A1 | 3/2008 | Zhang |
| 2008/0084867 A1 | 4/2008 | Foti et al. |
| 2009/0210536 A1 | 8/2009 | Allen et al. |
| 2009/0259758 A1 | 10/2009 | Chen et al. |
| 2011/0023096 A1 * | 1/2011 | Xiao et al. ..................... 726/5 |
| 2011/0029999 A1 * | 2/2011 | Foti ............................... 725/25 |
| 2011/0153854 A1 | 6/2011 | Chickering |
| 2011/0231784 A1 | 9/2011 | Meng et al. |
| 2011/0231923 A1 * | 9/2011 | Bollay et al. ..................... 726/9 |
| 2012/0023167 A1 * | 1/2012 | Hovdal et al. .................. 709/204 |
| 2012/0066373 A1 | 3/2012 | Ochoa et al. |
| 2012/0198531 A1 * | 8/2012 | Ort et al. ......................... 726/7 |
| 2012/0201361 A1 * | 8/2012 | Angel et al. .................. 379/88.01 |
| 2013/0290494 A1 * | 10/2013 | Goudarzi et al. .............. 709/219 |
| 2014/0059344 A1 * | 2/2014 | Branton et al. ................ 713/165 |
| 2014/0113556 A1 * | 4/2014 | Kotecha ........................ 455/41.2 |
| 2014/0122730 A1 * | 5/2014 | Burch et al. ................... 709/228 |
| 2014/0156854 A1 * | 6/2014 | Gaetano, Jr. .................. 709/227 |

OTHER PUBLICATIONS

"U.S. Appl. No. 13/663,736, Response filed Feb. 4, 2015 to Non Final Office Action mailed Nov. 5, 2014", 8 pgs.

* cited by examiner

TECHNIQUES FOR DESKTOP MIGRATION

RELATED APPLICATIONS

The present application is co-pending with, claims priority to, and is a Continuation-in-Part (CIP) of U.S. patent application Ser. No. 13/663,736, entitled: "Techniques for Device Independent Session Migration," filed Oct. 30, 2012, the disclosure of which is incorporated by reference herein in its entirety.

BACKGROUND

As the industry increases the use of mobile devices, there is a problem when users work in a mixed environment of desktop machines and mobile devices. There are times that a user is working on his/her desktop machine and needs to continue a desktop session on his/her mobile device.

There are currently products on the market that allow a mobile device such as an iPad® to "remote" in to a desktop machine and gain control of the desktop system. To do this, the end user must start a program on the remote iPad® and authenticate to the desktop machine. The authentication credentials, such as name and password, along with the Internet Protocol (IP) addresses of the desktop are sometimes stored on the iPad® to make it easier to authenticate. There is very little control of the how, where, and when the end user can remote to his/her desktop by the company administrator, The IP address of the desktop device can change based on time of use or the machine that is being used. This creates a large security, control, and compliance problem for system administrators and a configuration problem for the end user. The best that the administrator can do is to shut down ports arid access, but this does not really solve the problem. Moreover, blocking an unknown application is very difficult.

SUMMARY

Various embodiments of the invention provide techniques for device independent session migration. In an embodiment, a method for session migration is presented.

Specifically, a token for desktop access to an original device is acquired; the token acquired directly from the original device. Then, the token is sent to a server desktop migration manager. Next, a second token is received from the sever session manager. Finally, remote access to a desktop and to desktop resources of the original device is established using the second token.

DETAILED DESCRIPTION

Figure 1:
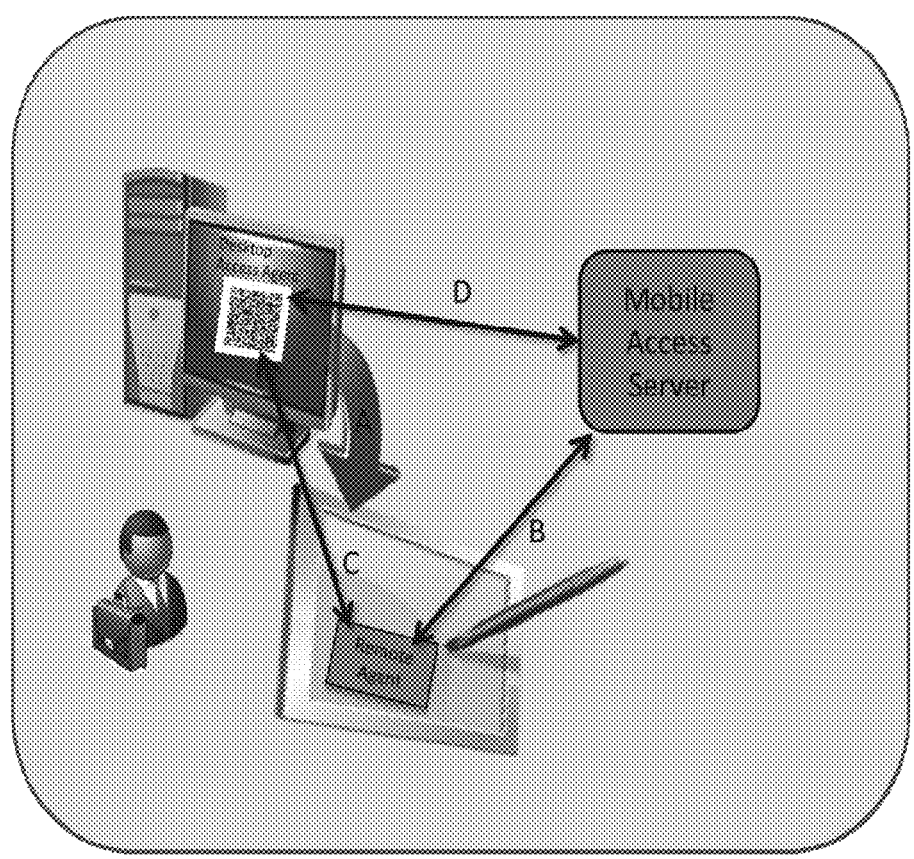
FIG. 1 is a diagram depicting a technique for desktop migration, according to an example embodiment presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc, Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram depicting a technique for desktop migration, according to an example embodiment presented herein. The technique includes a variety of components that is implemented, programmed, and resides within a non-transitory machine-readable storage medium that executes on one or more processors of a network. The network may be wired, wireless, or a combination of wired and wireless.

It is noted that the components and interactions of the FIG. 1 are presented for purposes of illustration and that other arrangements including more or less components are possible without departing from the teachings provided herein.

The components of the FIG. 1 are discussed within the context of a working example to demonstrate how some embodiments of the invention work and how a user can use those embodiments. The following description and analysis provided with respect to the FIG. 1, are illustrative and are not intended to depict all foreseeable embodiments of the invention, and therefore should not be construed as limitations.

John logins in to his desktop in the morning and begins using MS Word® to edit a document. The Word® document may be on his hard drive or on a network resource that he has authenticated to. While editing the document, he needs to leave his office and go to a meeting but, he is not done with his changes to the document, so he grabs his mobile device (an iPad® in this case) and selects the "Mobile Access Remote Agent" (MARA) application. He, points the camera on the device at the desktops screen and the next thing he sees is his PC desktop on his iPad'e mobile device. He can now continue what he was doing on his desktop using his mobile device as he goes to his meeting. From the iPad®, he can save the document as he would from his desktop PC. He is not limited to the Word® application while using the iPad® but can run any program on the desktop while on his iPad®. This is because the application is running on the PC desktop, the iPad® is only remoted in to the desktop. When he returns to his office he can continue using his desktop machine if needed.

The components and the processing for those components (the FIG. 1) are now discussed to describe how John's desktop is seamlessly and securely migrated from his first device to his iPad®.

Consider a following specific situation for purposes of illustration.

1). The user authenticates to the desktop in the normal manner that he/she always does. This can be via a name/password, NTLM (NT LAN Manager) or any other method. When the machine boots, the "Desktop Agent Access" (DAA) is started automatically. When the DAA starts it authenticates to the "Mobile Access Server" (MAS) via (D). This authentication requires no user interaction. The MAS validates the authentication and checks policy to determine what access should be allowed. If validated, the MAS returns a packet of data that includes an access token and other information via (D).

2). The DAA uses this data to build a glyph that can be easily read via optical, such as a Quick Response (OR) Code. The glyph includes addition information about the desktop, time of day and may also have a secret. This glyph is then displayed on the screen of the desktop.

3). When the user wishes to continue the work he/she was doing on the desktop, on his/her mobile device (i.e. an iPad®), he/she selects the "Mobile Remote Agent" (MRA) application on his/her iPad® and, points the camera at the desktop screen. (The MRA uses the camera to read the data glyph (QR coded data) from the desktop screen into the iPad® (A).) The QR data is decoded, validated, and potentially signed by the iPad® MRA application and then sent to the "MAS" server (B). The iPad® MAS application may also prove its identity (via signing) and/or encrypt the data sent to the MAS server if configured.

4). The MAS server validates the Access Token. The token may have a time to live and scope of access. If required, by policy, the identity of the iPad® device may also be validated. If the desktop device is in the scope of the access token and all other access policies are met, the MAS server builds a new remote token for the desktop that the glyph was taken from. This token is then used to start a remote desktop application on the iPad'o connected to the Desktop that is authenticated via the token. The token can be as simple as a name/password or federated token. The only requirement is that the Desktop remote application can validate the token.

5), The desktop in now remoted on the iPad® device. The end user can now continue working on whatever he/she was doing through remote execution.

Device Registration

The above example shows how the users access a system using various components of the invention and assumes that the receiving device (target of desktop migration or "target device") is trusted or that no device trust is needed. When the iPad® MAS application sends the access token to the MAS server (step 3 above), the iPad® may be required to validate its device identity to the MAS server to be trusted. The next example shows how the device becomes trusted.

1) In step (3) above, if the iPad® device must be trusted and it is not trusted, the MAS server may respond to the MAS application (B) with a request to register the device.

2) The MAS application prompts the user to enter his/her credentials. The MAS application then generates a key pair or secret and device la The token can include a Public/Private key pair or a secret key, and device ID.

3) The secret key or the public part of the Public/Private key pair, the device ID, and the user credentials are then sent to the MAS server, via the MAS application, to be validated.

4) If the user credentials are valid, the device is registered and the device can use the private key or secret for other subsequent requests.

Device (iPad) De-Registration

If the user has had a device lost or stolen he/she may de-register the device from any browser application as follows.

1) The user enters the URL of the MAS service (proxy and/or MAS server) into any browser and is presented with a menu of choices. He/she selects a de-register a device option from the menu of choices.

2) If the user is not already authenticated, he/she is prompted for his/her credentials. If the credentials are valid, the MAS server shows a list of devices registered to the user.

3) He/She selects the device and can now choose to "Delete" or "Disable" the device. At this point, the device is no longer able to use the MAS server as a trusted device known to the MAS server.

As discussed above and as discussed in greater detail and specificity below, the teachings herein provide for user simplicity and security during device desktop migration, such benefits include, but are not limited to:

1) allowing users to transparently transfer a desktop from one device (original device) to another device (target device);

2) allowing users to pick up a desktop session without the need to configure Internet Protocol (IP) addresses, enter user credentials or other information, only visual or physical proximity to the desktop is needed by the mobile device of the user;

3) using a visible token to validate:
  A) that the device is close to an authenticated system (in view or with a predefined degree of physical proximity);
  B) that the view of the authenticated system is current, not a picture used at a later time—the tokens are dynamic and have limited time to be used;
  C) that the device is a trusted device;
  D) that multifactor authentication is enabled via a single button of the mobile device; and
  E) that a user might have to take an action to present the visible token for scanning;

4) using current VNC/RPC or other remote software to allow single button connect;

5) allowing dynamic tokens that:
  A) control the time that the tokens are valid;

B) handle variable IP addresses and location-based and dynamic credentials;
6) allowing dynamic configuration that:
A) permit IP addresses to change;
B) allow the desktop session to be started from inside a firewall to allow access; and
C) permit credentials to change as needed.

Figure 2:
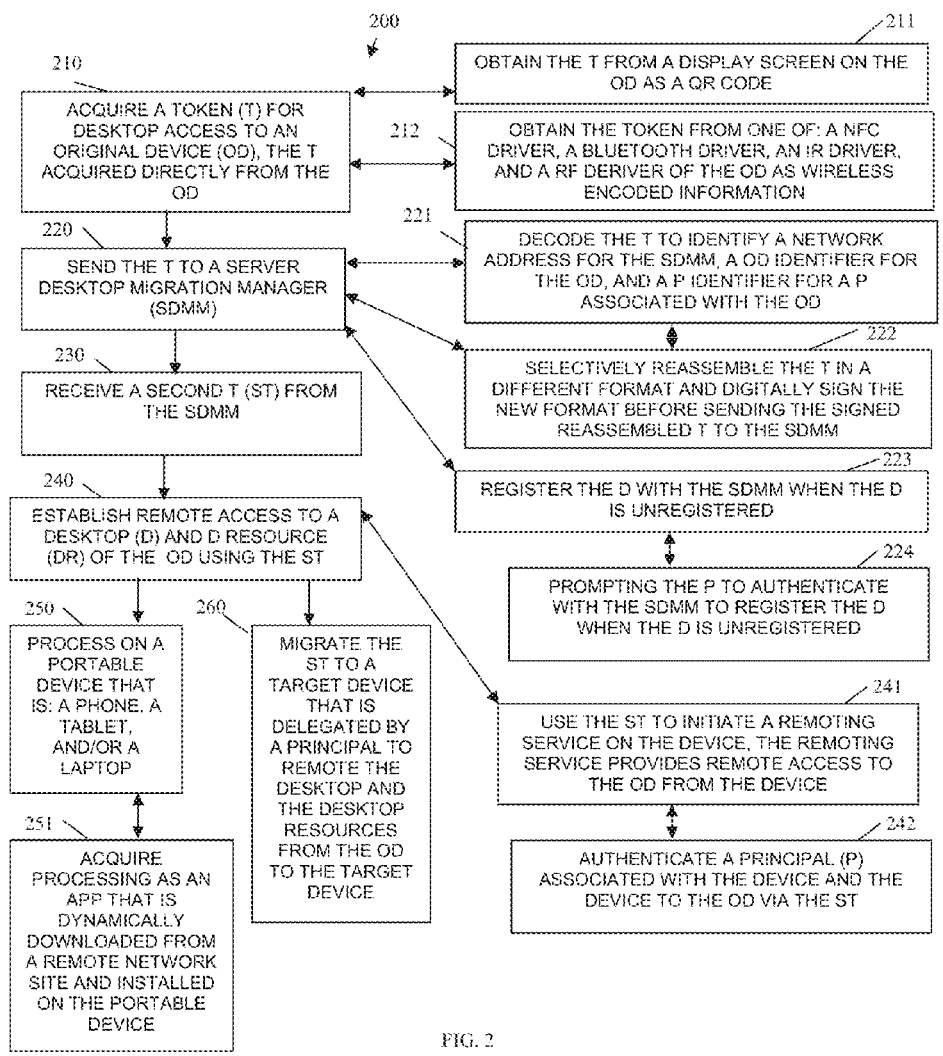
FIG. 2 is a diagram of a method for desktop migration, according to an example embodiment presented herein.

FIG. 2 is a diagram of a method 200 for desktop migration, according to an example embodiment presented herein. The method 200 (herein after referred to as "device desktop migration manager") is implemented, programmed, and resides within a non-transitory machine-readable storage medium that executes on one or more processors of a device and is operational over a network. The network may be wired, wireless, or a combination of wired and wireless.

The device desktop migration manager provides the processing perspective of an app on a user's device, such as the "MAS App" discussed above from with the FIG. 1. The device desktop migration manager interacts with a proxy and/or a server (such as the "Proxy" and "Mass Server" presented above with the FIG. 1) and a first device having a native desktop that is being remoted on the device that processes the device desktop migration manager. The processing perspective of the Proxy and/or Server is provided below with the discussion of the FIG. 3.

At 210, the device desktop migration manager acquires a token for a desktop migration. The token is for desktop access to an original device and the token acquired directly from the original device. The device that processes the device desktop migration manager is a device that is going to remote the desktop and desktop resources from the original device. The device desktop migration manager acquires the token from the original device while in a configured geographic proximity to the original device.

In an embodiment, at 211, the device desktop migration manager obtains the token from a display screen of the original device as a Quick Response (OR) code. This can be achieved via a camera integrated into the device that processes the device desktop migration manager. A user points the camera to the QR code that is presented in the display screen of the original device.

In another case, at 212, the device desktop migration manager obtains the token from one of: a Near Field Communication (NFC) driver, a Bluetooth driver, an infrared driver, and a Radio Frequency (RF) driver of the original device as wireless encoded information accessible to the device that processes the device desktop migration manager when the device is within a configurable distance to the original device. In the case, of NFC a tap of the device to the original device may be used for the device desktop migration manager to acquire the token from the original device.

At 220, the device desktop migration manager sends the token to a server desktop migration manager (such as the MAS application discussed above with reference to the FIG, 1 and discussed in greater detail below with reference to the FIGS. 3 and 4).

According to an embodiment, at 221, the device desktop migration manager decodes the token to identify a network address for the server desktop migration manager, an original device identifier for the original device, and a principal identifier for a principal associated with the original device (and the device that processes the device desktop migration manager).

Continuing with the embodiment of 221 and at 222, the device desktop migration manager selectively reassembles the token in a different format and digitally signs the new format before sending the signed reassembled token to the server desktop migration manager. This could provide even greater security by including a secure module on the device that processes the device desktop migration manager to reorder and maybe augment the original token and then sign and send that token to the server desktop migration manager.

In an embodiment, at 223, the device desktop migration manager registers the device with the server desktop migration manager when the device of the device desktop migration manager is unregistered.

Continuing with the embodiment of 223 and at 224, the device desktop migration manager prompts the principal to authenticate with the server desktop migration manager to register the device of the device desktop migration manager when the device is unregistered.

At 230, the device desktop migration manager receives a second token back from the server desktop migration manager. This was described above with reference to the FIG. 1 and is discussed again below with reference to the FIG. 3.

At 240, the device desktop migration manager establishes remote access to a desktop and desktop resources of the original device using the second token. Any remoting software can be used, such as what was discussed above with reference to the FIG. 1.

According to an embodiment, at 241, the device desktop migration manager uses the second token to initiate a remoting service (remoting software) on the device that processes the device desktop migration manager. The remoting service provides access to the original device from the device of the device desktop migration manager.

Continuing with the embodiment of 241 and at 242, the device desktop migration manager authenticates a principal associated with the device of the device desktop migration manager and authenticates the device to the original device by presentation and use of the second token to the original device.

In an embodiment, at 250, the device desktop migration manager processes the device desktop migration manager on a portable device that is one of: a phone, a tablet, and/or a laptop. In fact, any processing device that is portable and it is noted that devices can be composite device, such that the can be a tablet, a laptop, and a phone all in one.

Continuing with the embodiment of 250 and at 251, the device desktop migration manager acquires the device desktop migration manager as an app that is dynamically downloaded from a remote network site and installed on the portable device. This can be acquired from an app store in some cases.

In another situation, at 260, the device desktop migration manager migrates the second token to a target device that is delegated by a principal to remote the desktop and the desktop resources from the original device to the target device. So, suppose the device that processes the device desktop migration manager is an iPhone® and the original device is a desktop computer. In this embodiment, the iPhone® can be used to perform the processing 210-240 and can then, if policy permits, delegate remoting the original device's desktop to a laptop (target device) by providing the second token to the laptop. It could be that the second token itself identifies multiple permissible devices that can use the second token to remote the desktop.

Figure 3:
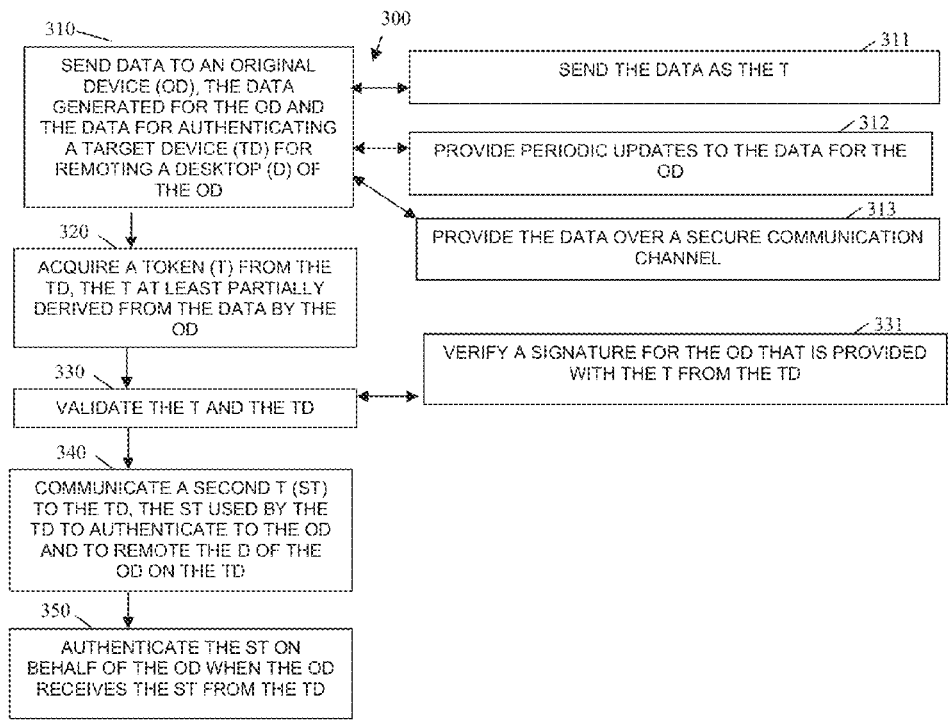
FIG. 3 is a diagram of another method for desktop migration, according to an example embodiment.

FIG. 3 is a diagram of another method 300 for desktop migration, according to an example embodiment. The method 300 (herein after referred to as "server desktop migration manager") is implemented, programmed, and resides within a non-transitory machine-readable storage medium that executes on one or more processors of a server and is operational over a network. The network may be wired, wireless, or a combination of wired and wireless.

The server desktop migration manager is presented from the perspective of device independent desktop migration processing occurring on a server and/or proxy. Some of the actions of the server desktop migration manager were discussed above with reference to the FIG. 1 (discussion of the proxy and/or the "MAS Serve").

The server desktop migration manager interacts with the device desktop migration manager of the FIG. 2 and with another device from where a desktop is being migrated from—an original device (device from which the desktop is being migrated) to a target device (described with respect to the FIG. 2—device that is ,emoting the desktop from the original device).

At 310, the server desktop migration manager sends data to an original device. The data specifically tailored and generated for the original device. Moreover, the data may be used for authenticating a target device (described below) for remoting a desktop of the original device. The data can also include time and/or event or condition limitations, such that when these event or condition limitations expire the data becomes stale arid cannot be used for authenticating the target device.

According to an embodiment, at 311, the server desktop migration manager sends the data as a token (discussed below with reference to 320). So, that data itself may be the token used by the original device.

In an embodiment, at 312, the server desktop migration manager provides periodic updates to the data for the original device. It may also be that the data is updated when requested by the original device (on demand) or updated on random or periodic intervals.

In yet another situation, at 313, the server desktop migration manager provides the data over a secure communication channel, such a Secure Socket Layer (SSL) and the like.

At 320, the server desktop migration manager acquires a token from the target device. The token is at least partially derived from the data by the original device (or as in the case of 311 the token is entirely derived from the data, since in that case the token is the data).

At 330, the server desktop migration manager validates the token and the target device. This can be done in a variety of manners, such as what has been discussed above with reference to the FIG. 1 and others.

For example, at 331, the server desktop migration manager verifies a signature for the original device that is provided with the token from the target device.

At 340, the server desktop migration manager communicates a second token back to the target device. The second token used by the target device to authenticate to the original device and to remote the desktop of the original device on the target device.

According to an embodiment, 350, the server desktop migration manager authenticates the second token on behalf of the original device when the original device receives the second token from the target device.

Figure 4:
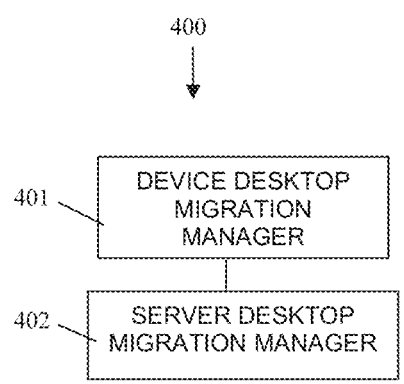
FIG. 4 is a diagram of a desktop migration system, according to an embodiment.

FIG. 4 is a diagram of a desktop migration system 400, according to an embodiment. The components of the desktop migration system 400 are implemented as executable instructions that reside within memory and/or non-transitory computer-readable storage media and those instructions are executed by one or more devices. The components and the devices operational over a network and the network can be wired, wireless, or a combination of wired and wireless.

According to an embodiment, the desktop migration system 400 implements, inter alia, the features of the FIGS. 1-3.

The desktop migration system 400 includes a device desktop migration manager 401 and a server desktop migration manager 402. Each of these and their interactions with one another will not be discussed in turn.

The desktop migration system 400 includes a target device having memory configured with the device desktop migration manager 401. Example processing associated with the device desktop migration manager 401 was presented above in detail with reference to the FIGS. 1 and 2.

The device desktop migration manager 401 is configured to capture a token within a configured proximity from an original device and communicate the token to the server desktop migration manager 402. Moreover, the device desktop migration manager 401 is further configured to use the second token to authenticate to the original device and to remote a desktop and desktop resources available from the original device on the target device.

The desktop migration system 400 also includes a server having memory configured with the server desktop migration manager 402. Example processing associated with the server desktop migration manager 402 was presented above in detail with reference to the FIGS. 1 and 3.

The server desktop migration manager 402 is configured to validate the token and the target device when received from the device desktop migration manager 401 and supply a second token back to the device desktop migration manager 401.

According to an embodiment, the server desktop migration manager 402 is further configured to supply the token or data used to construct the token to the original device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a device configured to perform the method, comprising:
   acquiring, by the device, a token for desktop access to an original device, the token acquired directly from the original device;
   sending, by the device, the token to a server desktop migration manager;
   receiving, by the device, a second token from the sever session manager; and
   establishing, on the device, remote access to a desktop and desktop resources of the original device using the second token and processing actions taken with the desktop resources remotely on the original device during the remote access, the original device maintaining the desktop resources as changed during the remote access from the actions taken, and the original device executes the desktop resources during remote access by the device.

2. The method of claim 1, wherein acquiring further includes obtaining the token from a display screen of the original device as a Quick Response (QR) code.

3. The method of claim 1, wherein acquiring further includes obtaining the token from one of: a Near Field Communication (NFC) driver, a Bluetooth driver, an Infrared driver, and a Radio Frequency (RF) driver of the original device as wireless encoded information.

4. The method of claim 1, wherein sending further includes decoding the token to identify a network address for the server desktop migration manager, an original device identifier for the original device, and a principal identifier for a principal associated with the original device and the device.

5. The method of claim 4, wherein decoding further includes selectively reassembling the token in a different format and digitally signing the new format before sending the signed reassembled token to the server desktop migration manager.

6. The method of claim 1, wherein sending further includes registering the device with the server desktop migration manager when the device is unregistered.

7. The method of claim 6, wherein registering further includes prompting a principal associated with the device to authenticate with the server desktop migration manager to register the device when the device is unregistered.

8. The method of claim 1, wherein establishing further includes using the second token to initiate a remoting service on the device, the remoting service providing the remote access to the original device from the device.

9. The method of claim 8, wherein using further includes authenticating a principal associated with the device and the device to the original device via the second token.

10. The method of claim 1 further comprising, processing the method on the device that is a portable device including one of: a tablet, a phone, and a laptop.

11. The method of claim 10, wherein the method is initially acquired on the device as an app that is dynamically downloaded from a remote network site and installed on the portable device.

12. The method of claim 1 further comprising, migrating, from the device, the second token to a target device, the target device delegated by a principal of the device to remote the desktop and the desktop resources from the original device on the target device.

13. A method implemented in a non-transitory machine-readable storage medium and processed by a server configured to perform the method, comprising:

sending, by the server, data to an original device, the data generated for the original device and the data for authenticating a target device for remoting a desktop of the original device;

acquiring, by the server, a token from the target device, the token at least partially derived from the data by the original device;

validating, by the server, the token and the target device; and communicating, by the server, a second token to the target device, the second token used by the target device to authenticate to the original device and to remote the desktop of the original device on the target device, and wherein resources of the original devices are executed on the original device during remoting of the desktop and when any resource is changed during the remoting by the target device that resources as changed remains on the original device.

14. The method of claim 13, wherein sending further includes sending the data as the token.

15. The method of claim 13, wherein sending further includes providing periodic updates to the data for the original device.

16. The method of claim 13, wherein sending further includes providing the data over a secure communication channel.

17. The method of claim 13, wherein validating further includes verifying a signature for the original device that is provided with the token from the target device.

18. The method of claim 13 further comprising, authenticating, via the server, the second token on behalf of the original device when the original device receives the second token from the target device.

19. A system, comprising:

a target device having memory configured with a device desktop migration manager, the device desktop migration manager processing on the target device; and a server having memory configured with a server desktop migration manager, the server desktop migration manager processing on the server;

wherein the device desktop migration manager is configured to capture a token within a configured proximity from an original device and communicate the token to the server desktop migration manager, the server desktop migration manager configured to validate the token and the target device when received from the device desktop migration manager and supply a second token back to the device desktop migration manager, the device desktop migration manager further configured to use the second token to authenticate to the original device and to remote a desktop and desktop resources available from the original device on the target device, and wherein the desktop resources execute on the original device during the remoting of the desktop and when changes to a particular resource occurs during the remoting of the desktop as made by the target device, those changes are retained on the original device.

20. The system of claim 19, wherein the server desktop migration manager is further configured to supply the token or data used to construct the token to the original device.

* * * * *